US010808051B2

(12) United States Patent
Defrancisci et al.

(10) Patent No.: US 10,808,051 B2
(45) Date of Patent: Oct. 20, 2020

(54) PRIMER MIXTURE OF CROSSLINKING INITIATOR AND PROMOTER

(71) Applicant: ARKEMA FRANCE, Colombes (FR)

(72) Inventors: Alfredo Defrancisci, Lyons (FR); Fabien Debaud, Lyons (FR)

(73) Assignee: ARKEMA FRANCE, Colombes (FR)

( * ) Notice: Subject to any disclaimer, the term of this patent is extended or adjusted under 35 U.S.C. 154(b) by 0 days.

(21) Appl. No.: 14/427,432

(22) PCT Filed: Sep. 6, 2013

(86) PCT No.: PCT/FR2013/052059
§ 371 (c)(1),
(2) Date: Mar. 11, 2015

(87) PCT Pub. No.: WO2014/041287
PCT Pub. Date: Mar. 20, 2014

(65) Prior Publication Data
US 2015/0239997 A1    Aug. 27, 2015

(30) Foreign Application Priority Data

Sep. 12, 2012   (FR) ..................................... 12 58569

(51) Int. Cl.

| | |
|---|---|
| *C08F 10/02* | (2006.01) |
| *C08L 23/06* | (2006.01) |
| *C08K 5/14* | (2006.01) |
| *C08K 5/23* | (2006.01) |
| *C08K 5/00* | (2006.01) |
| *H01B 3/44* | (2006.01) |
| *C08K 5/101* | (2006.01) |
| *C08K 5/3415* | (2006.01) |

(52) U.S. Cl.
CPC ............ *C08F 10/02* (2013.01); *C08K 5/0025* (2013.01); *C08K 5/14* (2013.01); *C08K 5/23* (2013.01); *C08L 23/06* (2013.01); *H01B 3/441* (2013.01); *C08K 5/101* (2013.01); *C08K 5/3415* (2013.01); *C08L 2312/00* (2013.01)

(58) Field of Classification Search
CPC ......... C08F 10/02; C08F 2810/20; C08K 5/14
See application file for complete search history.

(56) References Cited

U.S. PATENT DOCUMENTS

| | | | |
|---|---|---|---|
| 3,455,752 A | 7/1969 | Gray et al. | |
| 4,101,512 A | 7/1978 | Schmidt et al. | |
| 4,212,787 A * | 7/1980 | Matsuda | C08J 9/0061 428/31 |
| 5,252,676 A * | 10/1993 | Suyama | H01B 3/441 525/263 |
| 6,303,666 B1 | 10/2001 | Yorita et al. | |
| 7,160,958 B2 | 1/2007 | Dluzneski | |
| 2011/0136931 A1* | 6/2011 | Kukaleva | C08F 2/50 521/142 |

FOREIGN PATENT DOCUMENTS

| | | |
|---|---|---|
| CN | 101608031 A | 12/2009 |
| EP | 0 522 729 A1 | 1/1993 |
| EP | 101608031 | 12/2009 |
| EP | 2 498 262 A1 | 9/2012 |
| FR | 2 392 072 A1 | 12/1978 |
| FR | 2822472 A1 * | 9/2002 ............. C08L 51/06 |
| JP | S53149241 A | 12/1978 |
| JP | S62199639 A | 9/1987 |
| JP | 3-79650 A | 4/1991 |
| JP | H05178944 A | 7/1993 |
| JP | 5-51796 B2 | 7/1994 |
| JP | H08259748 A | 10/1996 |
| JP | H11181174 A | 7/1999 |

OTHER PUBLICATIONS

Translation of FR 2822472 (2002) (Year: 2002).*
International Search Report (PCT/ISA/210) dated Oct. 22, 2013, by the French Patent Office as the International Searching Authority for International Application No. PCT/FR2013/052059.
Ghasemi, I. et al."The Effect of Co-agent on the Peroxide Crosslinking of LDPE" Iranian Polymer Journal, vol. 12, No. 2, 2003, pp. 199-125.
Definitions : impregner—Dictionnaire de franyais Larousse, 1 page.

(Continued)

Primary Examiner — Robert C Boyle
(74) Attorney, Agent, or Firm — Buchanan Ingersoll & Rooney P.C.

(57) ABSTRACT

A primer mixture intended for crosslinking polyethylene, including at least an initiator of free radicals chosen from organic peroxides, azo compounds or mixtures thereof, wherein the mixture has said free-radical initiator and at least one crosslinking promoter chosen from the cycloalkanes having 5 to 7 carbon atoms, substituted by 1 to 3 vinyl, allyl or isopropenyl groups, the aromatic compounds substituted by 1 to 3 vinyl, allyl or isopropenyl groups, the methacrylate, acrylate and maleimide monomers being multi-substituted, and in that the weight ratio of free-radical initiator to the crosslinking promoter is greater than or equal to 1, and preferably between 1.5 and 4. Also, a method and to a use related to this primer mixture.

17 Claims, 2 Drawing Sheets

(56) References Cited

OTHER PUBLICATIONS

Office Action (The Third Office Action) dated Oct. 23, 2017, by the State Intellectual Property Office of the People's Republic of China in corresponding Chinese Patent Application No. 201380058834.1, and an English Translation of the Office Action, (12 pages).
Office Action (Notice of Reasons for Refusal) dated Apr. 18, 2018, by the Japanese Patent Office in corresponding Japanese Patent Application No. 2015-530482, and an English Translation of the Office Action. (10 pages).
"Grounds for the Decision (Annex)—Opposition" mailed Jul. 22, 2019 in European Patent No. 2895536, 29 pages.
"Grounds of Appeal", mailed Nov. 29, 2019 in European Patent No. 2895536, 23 pages.
"Intermediate Decision in Opposition Proceedings (Article 101 (3) (a) and 106 (2)", mailed Jul. 22, 2019 in European Patent No. 2895536, 2 pages.
"Reply to Appeal against the Interim Decision of the Opposition Division", mailed Jun. 16, 2020 in European Patent No. 2895536, 21 pages.
"Written Decision in Preparation to/During Oral Proceedings with Annexure", mailed Apr. 18, 2019 European Patent No. 2895536, 17 pages.
Zhao, et al., "Triple Shape Memory Effects of Cross-Linked Polyethylene/ Polypropylene Blends with Cocontinuous Architecture", ACS Applied Materials and Interfaces, vol. 5, May 28, 2013, pp. 5550-5556.

\* cited by examiner

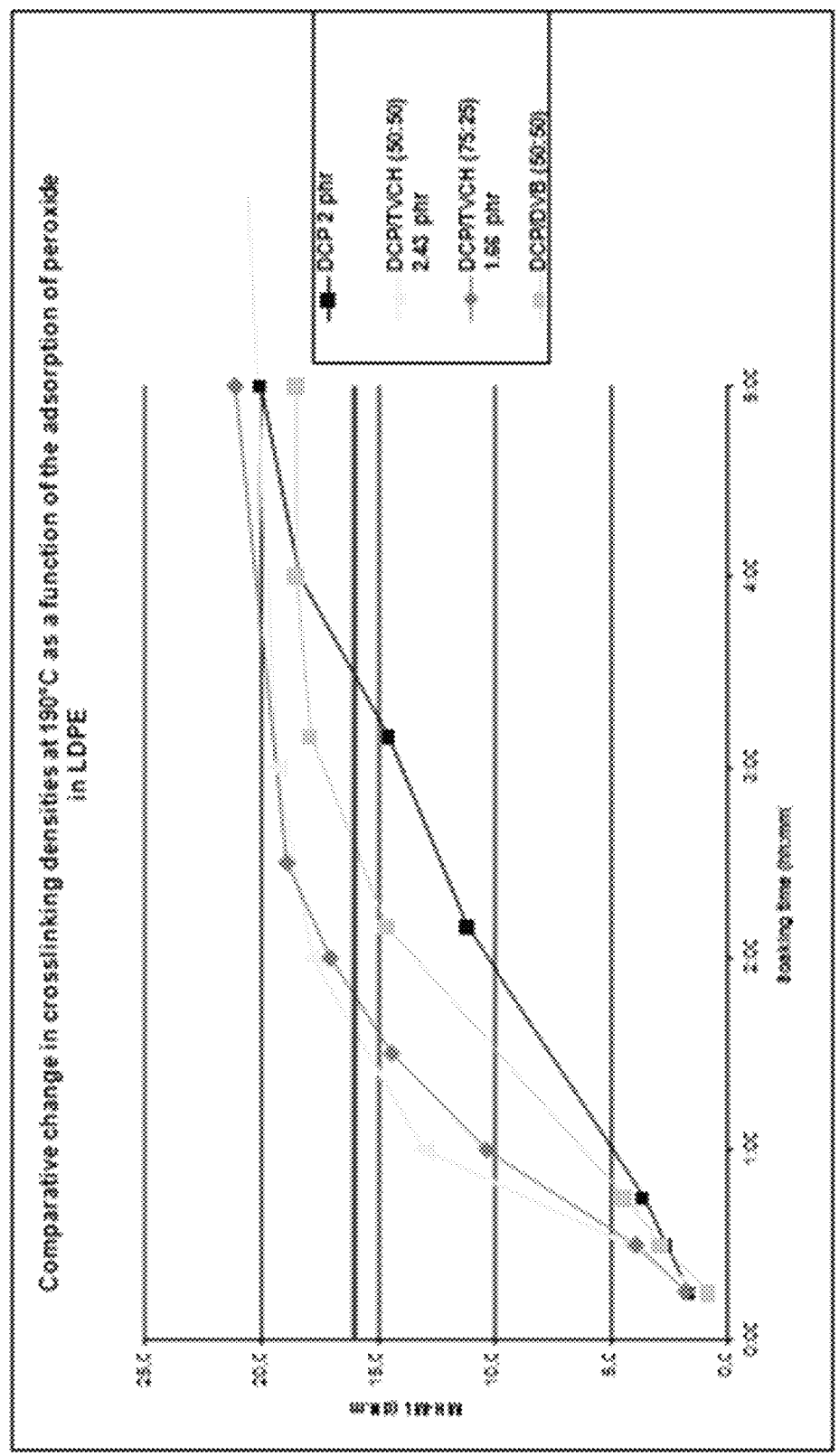
Figure 1: Change in crosslinking densities as a function of the impregnation time for the 4 systems studied.

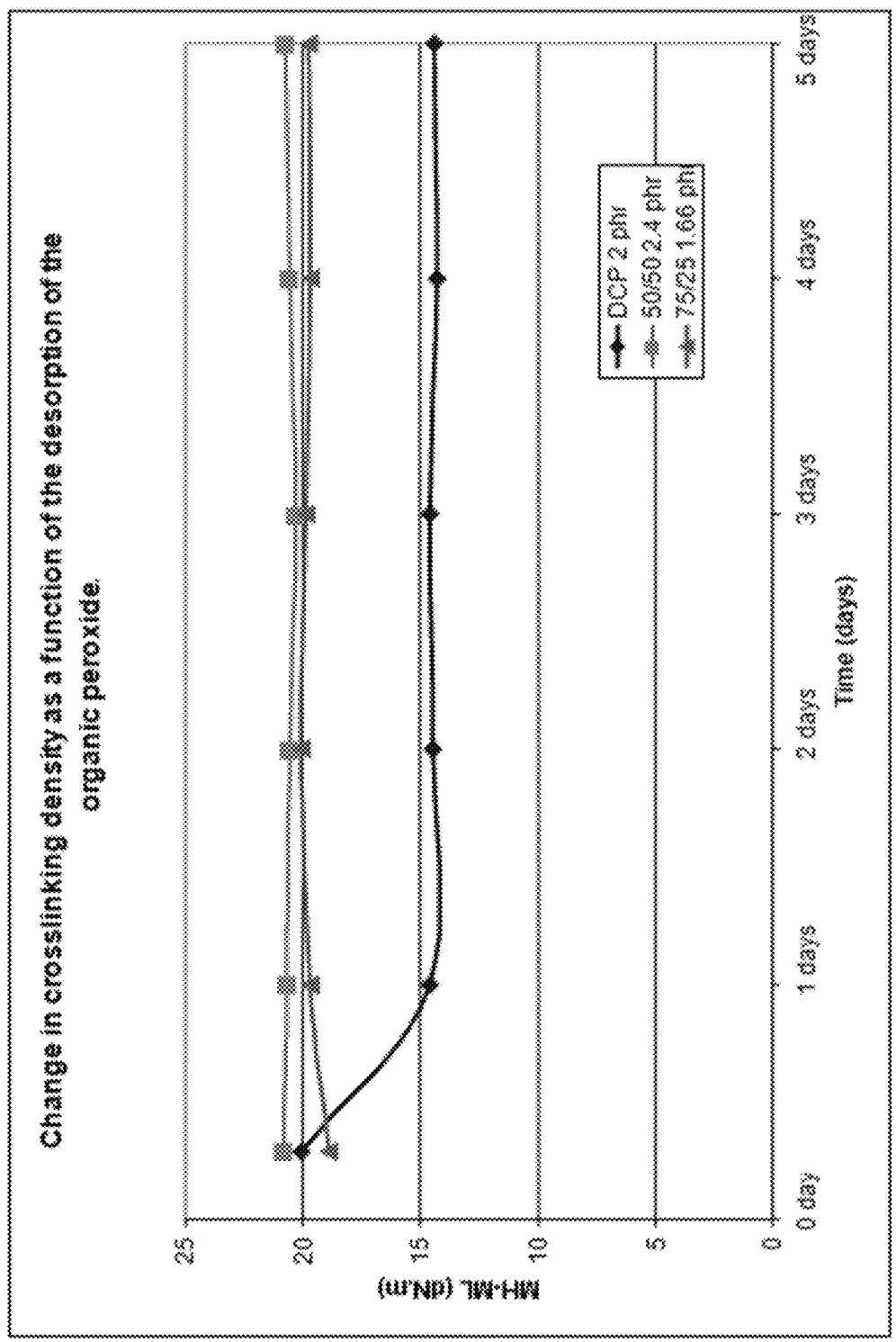
Figure 2: Change in crosslinking densities as a function of the storage time at 5°C for the 3 systems studied.

PRIMER MIXTURE OF CROSSLINKING INITIATOR AND PROMOTER

FIELD OF THE INVENTION

The invention relates to the impregnation of polymer granules (composition) with a free radical initiator mixture predissolved in a crosslinking promoter (primer mixture). The invention also relates to a process for manufacturing a crosslinked polymer preimpregnated with a free-radical initiator mixture dissolved in a crosslinking promoter.

The free-radical initiator is chosen from organic peroxides and azo compounds, and mixtures thereof.

Free-radical initiators decompose thermally, producing free radicals. They make it possible to give to many polymers, and more particularly to rubbers and polyolefins, excellent mechanical, thermal and chemical properties, by means of the formation of covalent bonds between the polymer chains. This operation is known as crosslinking. In the case of crosslinking with peroxides used without promoter, a crosslinking bond is a carbon-carbon bond between the adjacent chains of the polymer.

Premature crosslinking reactions reduce the viscoelastic properties of the polymer, such that the material can no longer be suitably converted, and bring about the formation of gel particles leading to a lack of homogeneity of the material.

In order to prevent premature decomposition of said free-radical initiator, it is advisable to mix the free-radical initiator with the polymer at a temperature not exceeding the melting point of the polymer.

This process of impregnation of the free-radical initiator into polymer granules often represents the limiting step in the production of these polymer granules. The reason for this is that it is often necessary for this step to take place at a certain temperature and for a certain time in order to ensure homogeneous impregnation of these granules. It is thus imperative to be able to minimize this impregnation step.

When the free-radical initiator at room temperature is in solid form, it thus generally needs to be heated above its melting point in order to be able to be incorporated in its liquid form into a polymer matrix.

Before being converted into finished product either by extrusion or injection-molding processes, the polymer granules must be able to be stored for several months without the crosslinking agent being desorbed from said granules. In order to prevent a lack of composition homogeneity of the product, the desorption time must be as long as possible.

The amount of free-radical initiator, generally organic peroxides, necessary for the crosslinking of polymers is sufficiently high to create problems of substantial generation of VOCs (volatile organic compounds). The reason for this is that the crosslinking reactions tend to release volatile products derived from the decomposition of the organic peroxides. Depending on the desired performance qualities, a long degassing process is then necessary after the production of the finished products to remove some of these volatile products, and more particularly methane in the case of applications of electrical cabling type.

PRIOR ART

None of the prior art documents makes it possible at the present time to solve all of the technical problems stated above.

Document U.S. Pat. No. 3,455,752 discloses a mixture of polyethylene and of premolten dicumyl peroxide for the production of crosslinked polyethylene for coating electrical cables.

Although this process method makes it possible to impregnate organic peroxide into polymer particles, this process is unsatisfactory in terms of retention capacity, since the peroxide becomes desorbed within days following the impregnation.

Oxidation reactions of organic peroxides may be inhibited by the presence of antioxidant. Document U.S. Pat. No. 4,101,512 discloses the dissolution of an antioxidant in premolten dicumyl peroxide. This mixture is then added to polyethylene granules for applications in the coating of electrical cables.

Document U.S. Pat. No. 7,160,958 discloses a mixture of organic peroxide with an absorption-promoting additive in polymer particles at a temperature above the melting point of the organic peroxide and below the glass transition temperature of the polymer.

The process described in said document U.S. Pat. No. 7,160,958 appears to allow an increase in the rate of absorption of the peroxide into the polymer granules, but only in the first minutes of the impregnation, whereas it is known that complete impregnation of the polymer is generally reached in several hours, to allow the peroxide to diffuse uniformly inside the polyethylene granules. It is also noted that the procedure explicitly described does not differ in any way from the prior art documents, namely that the free-radical initiator(s), an optional crosslinking promoter and the polymer are mixed at the same time or within a short or even very short interval.

Moreover, in said document, dicumyl peroxide is added in solid form to the polyethylene granules. In industry, this operating procedure is, at the present time, no longer used on account of the risk of poor absorption that this procedure might entail.

Document FR 7 815 556 is also known, which discloses a thermoplastic composition, characterized in that it comprises:

100 to 5 parts by weight of (A) a partially vulcanized elastomeric composition obtained by dynamic heat treatment, in the presence of an organic peroxide, of a mixture of 100 to 40 parts by weight of (a) a peroxide-vulcanizable olefin copolymer rubber, 0 to 60 parts by weight of (b) an olefinic plastic decomposed with peroxides, the sum of constituent (a) and of constituent (b) being 100 parts by weight, and 5 to 100 parts by weight of at least one product chosen from (c) a hydrocarbon-based rubbery material that is not peroxide-vulcanizable and (d) a plasticizer of the mineral oil type; and 0 to 95 parts by weight of (B) an olefinic plastic; the sum of constituent (b) and of constituent (B) not representing less than 5 parts by weight per 100 parts by weight of the final composition.

However, in all the examples disclosed in said document, the weight ratio of organic peroxide to crosslinking promoter is very much less than 1 (about 0.6), which fundamentally changes the physicochemical properties of the composition.

BRIEF DESCRIPTION OF THE INVENTION

After various experiments and manipulations, it has been found that the predissolution of free-radical initiator in a crosslinking promoter before the impregnation of this mixture into polymer granules relative to the use of a peroxide alone (without predissolution in a crosslinking promoter, optionally added subsequently) has the following advantages:

- the mixture of free-radical initiator and of crosslinking promoter is either liquid at room temperature or liquid at the temperature of impregnation of the polyethylene, i.e. at a temperature slightly higher than room temperature;
- the impregnation time (of the free-radical initiator into the polyethylene) is markedly reduced, which may in certain cases be halved relative to the use of free-radical initiator not dissolved in the crosslinking promoter;
- the mixture of free-radical initiator and of crosslinking promoter does not become desorbed from the polymer, or does so with kinetics that are very significantly reduced relative to those of the prior art processes;
- the amount of free-radical initiator required is significantly reduced, this reduction possibly being up to 40%, while at the same time maintaining a crosslinking density equivalent to that of the prior art processes;
- the release of volatile products is also significantly reduced, like the amount of free-radical initiators, this reduction may be up to 40%, relative to the use of organic peroxide not predissolved with the crosslinking promoter.

The dissolution of the free-radical initiator in a crosslinking promoter in order to form the primer mixture is a preliminary operation performed in a variable time depending on the peroxide/promoter couple chosen and also on the mixing temperature, which may range from a few minutes to several hours. The dissolution and homogenization of the primer mixture is an essential step for ensuring the best impregnation results for the primer mixture into the polymer.

Thus, the present invention relates to a primer mixture intended for crosslinking polyethylene, comprising at least one free-radical initiator chosen from organic peroxides and azo compounds or mixtures thereof, characterized in that it consists of said free-radical initiator and at least one crosslinking promoter chosen from cycloalkanes containing 5 to 7 carbon atoms, substituted with 1 to 3 vinyl, allyl or isopropenyl groups, aromatic compounds substituted with 1 to 3 vinyl, allyl or isopropenyl groups, multi-substituted monomers based on methacrylate, acrylate, maleimide and in that the weight ratio of free-radical initiator to crosslinking promoter is greater than or equal to 1 and preferably between 1.5 and 4.

Other characteristics and features of the primer mixture of the invention are presented below:

- preferably, the crosslinking promoter is trivinylcycloalkane and/or divinylbenzene;
- preferably, the free-radical initiator is dicumyl peroxide, 2,5-dimethyl-2,5-bis(t-butylperoxy)hexane or bis[(t-butylperoxy)isopropyl]benzene or a mixture of these initiators;
- according to a feature intrinsic to the invention, the primer mixture is in liquid form at room temperature, i.e. at least for a temperature between 10° C. and 50° C. at ambient pressure (1 bar).

The invention also relates to a composition for crosslinking polyethylene, comprising polyethylene, preferably low-density polyethylene, characterized in that it also comprises a primer mixture as described above. This composition is understood here to be all of the components (free-radical initiator, crosslinking promoter and polyethylene) before the polyethylene crosslinks.

According to one possibility offered by the invention, the composition according to the invention also comprises at least one UV stabilizer, a processing agent, an antifogging agent, an antiblocking agent, a coupler, a pigment, a dye, a plasticizer, a fluidizing agent, a flame retardant and/or a crosslinking retardant.

The invention also relates to a process for manufacturing crosslinked polyethylene, comprising a final step of polyethylene crosslinking, in which:

- a free-radical initiator is chosen from organic peroxides, azo compounds or mixtures thereof, and preferably said initiator is chosen from dicumyl peroxide, 2,5-dimethyl-2,5-bis(t-butylperoxy)hexane and bis[(t-butylperoxy)isopropyl]benzene or a mixture of these initiators, and in which
- at least one crosslinking promoter is chosen from cycloalkanes containing 5 to 7 carbon atoms, substituted with 1 to 3 vinyl, allyl or isopropenyl groups, aromatic compounds substituted with 1 to 3 vinyl, allyl or isopropenyl groups, multi-substituted monomers based on methacrylate, acrylate, maleimide, preferably said promoter is chosen from trivinylcycloalkane and/or divinylbenzene, characterized in that a step of dilution of said free-radical initiator with said crosslinking promoter is initially performed, and impregnation of the primer mixture thus formed (as described above), in liquid form, with polyethylene is then performed.

According to one possibility offered by the invention, during the abovementioned dilution step, the crosslinking promoter is present in liquid form at room temperature and pressure, i.e. for a temperature of between 10° C. and 50° C. at a pressure of 1 bar.

Advantageously, the crosslinking step is performed by extrusion or by injection-molding.

Finally, the present invention relates to the use of the primer mixture as described above or of the abovementioned composition for the production of cables, especially for transporting fluid or electrical current.

The description that follows is given solely for the purposes of non-limiting illustration.

BRIEF DESCRIPTION OF THE DRAWINGS

The accompanying drawings, which are incorporated in and constitute a part of the Specification, illustrate graphical results of examples.

FIG. 1 illustrates a change in crosslinking densities as a function of the impregnation time for the four systems studied.

FIG. 2 illustrates a change in crosslinking densities as a function of the storage time at 5° C. for the three systems studied.

DETAILED DESCRIPTION OF THE INVENTION

The present invention is directed toward the crosslinking of polymer. The polymer according to the invention may be any type of polymer that may be crosslinked with organic peroxides, the present invention being more particularly directed toward the crosslinking of polyethylene.

As regards polyethylene, it is understood that high-density polyethylenes (HDPE), low-density polyethylenes (LDPE), linear low-density polyethylene (LLDPE), very low density polyethylenes (VLDPE), polyethylenes obtained by metallocene catalysis, copolymers of ethylene with one or more comonomers, such as ethylene-propylenediene terpolymers (EPDM), ethylene-propylene copolymers (EPM), ethylene-vinyl acetate (EVA) copolymers, copolymers of ethylene-alkyl acrylate (EMA, EEA, EBA) and copolymers of ethylene-($\alpha$,$\omega$)-alkadienes are included.

The other polymers concerned by the present invention are hydrogenated butadiene-acrylonitrile copolymers (HNBR), butadiene-acrylonitrile copolymers (NBR), fluoroelastomers (FKM) and polybutadienes (PBU). Polymers such as high-density polyethylenes, low-density polyethylenes and ethylene-propylene copolymers are particularly preferred. However, in the specific context of polyethylene crosslinking and for this invention, low-density polyethylenes will preferentially be chosen.

As regards the free-radical initiator, it is understood to be organic peroxides, and more particularly organic peroxides used as crosslinking agents such as dialkyl peroxides, diperoxyketals and certain monoperoxycarbonates, to which may be added azo compounds. The free-radical initiator of the primer mixture according to the invention may consist of one or more organic peroxides and/or azo compounds.

Among the dialkyl peroxides, the preferred initiators are: dicumyl peroxide (sold as Luperox® DC or Luperox® DCP), di-t-butyl peroxide (Luperox® DI), t-butylcumyl peroxide (Luperox® 801), 2,5-dimethyl-2,5-bis(t-butylperoxy)hexane (Luperox® 101), 2,5-dimethyl-2,5-bis(t-amylperoxy)hexane, 2,5-dimethyl-2,5-bis(t-butylperoxy)-3-hexyne (Luperox® 130), 2,5-dimethyl-2,5-bis(t-amylperoxy)-3-hexyne, $\alpha$,$\alpha$'-bis-[(t-butylperoxy)isopropyl]benzene (Luperox® F), $\alpha$,$\alpha$'-bis[(t-amylperoxy)isopropyl]benzene (Luperox® 180), di-t-amyl peroxide (Luperox® DTA), 1,3,5-tris[(t-butylperoxy)isopropyl]benzene, 1,3-dimethyl-3-(t-butylperoxy)butanol, 1,3-dimethyl-3-(t-amylperoxy)butanol. The mixture of dicumyl peroxide and 1,3- and 1,4-isopropylcumyl cumyl peroxide (Luperox® DC60) is also advantageous.

Certain monoperoxycarbonates such as O,O-tert-butyl-O-(2-ethylhexyl) monoperoxycarbonate (Luperox® TBEC), O,O-tert-butyl-O-isopropyl monoperoxycarbonate (Luperox® TBIC) and O,O-tert-amyl-O-2-ethylhexyl monoperoxycarbonate (Luperox® TAEC) are also used.

Among the diacyl peroxides, the preferred initiator is benzoyl peroxide (Luperox® A75).

Among the diperoxyketals, the preferred initiators are: 1,1-bis(t-butylperoxy)-3,3,5-trimethylcyclohexane (Luperox® 231), n-butyl 4,4-bis(t-amylperoxy)valerate (Luperox® 230), ethyl 3,3-bis(t-butylperoxy)butyrate (Luperox® 233), 2,2-bis(t-amylperoxy)propane, 3,6,6,9,9-pentamethyl-3-ethoxycarbonyl-methyl-1,2,4,5-tetraoxacyclononane, 3,3,5,7,7-pentamethyl-1,2,4-trioxepane, n-butyl 4,4-bis(t-butylperoxy)valerate, ethyl 3,3-bis(t-amylperoxy)butyrate, 1,1-bis(t-butylperoxy)cyclohexane (Luperox® 331), 1,1-bis(t-amylperoxy)cyclohexane (Luperox® 531), and mixtures thereof.

As azo compounds, examples that may be mentioned include 2,2'-azobis-(2-acetoxypropane), azobisisobutyronitrile, azodicarbamide, 4,4'-azobis(cyanopentanoic acid) and 2,2'-azobismethylbutyronitrile.

As regards the crosslinking promoter, this is understood as being cycloalkanes containing 5 to 7 carbon atoms, substituted with 1 to 3 vinyl, allyl or isopropenyl groups, aromatic compounds substituted with 1 to 3 vinyl, allyl or isopropenyl groups, or multi-substituted monomers based on methacrylate, acrylate or maleimide.

Mention may be made, for example, of vinylcyclohexane, divinylcyclohexane, trivinylcyclohexane, vinylcyclopentane, diisopropenylcyclohexane and triisopropenyl cyclohexane.

Cyclohexane substituted with 1 to 3 vinyl or allyl groups is advantageously used, in particular trivinylcyclohexane.

Commercial trivinylcyclohexane predominantly contains 1,2,4-trivinylcyclohexane.

As crosslinking promoter of multi-substituted aromatic type, mention may be made of divinylbenzene, diisopropenylbenzene, $\alpha$-methylstyrene, $\alpha$-methylstyrene dimer and triallyl trimellitate.

As crosslinking promoter based on multi-substituted methacrylate, mention may be made of ethylene glycol dimethacrylate, phenylene dimethacrylate, diethylene glycol dimethacrylate, triethylene glycol dimethacrylate, tetraethylene glycol dimethacrylate, polyethylene glycol 200 dimethacrylate, polyethylene glycol 400 dimethacrylate, 1,3-butanediol dimethacrylate, 1,4-butanediol dimethacrylate, 1,6-hexanediol dimethacrylate, 1,12-dodecanediol dimethacrylate, 1,3-glycerol dimethacrylate, diurethane dimethacrylate and trimethylolpropane trimethacrylate.

The crosslinking promoter based on multi-substituted methacrylate is advantageously used, in particular ethylene glycol dimethacrylate and trimethylolpropane trimethacrylate.

As crosslinking promoter based on multi-substituted acrylate, mention may be made of bisphenol A epoxy diacrylate, dipropylene glycol diacrylate, tripropylene glycol diacrylate, polyethylene glycol 600 diacrylate, ethylene glycol diacrylate, diethylene glycol diacrylate, triethylene glycol diacrylate, tetraethylene glycol diacrylate, neopentyl glycol ethoxylate diacrylate, butanediol diacrylate, hexanediol diacrylate, aliphatic urethane diacrylate, trimethylolpropane triacrylate, trimethylolpropane ethoxylate triacrylate, trimethylolpropane propoxylate triacrylate, glycerol propoxylate triacrylate, aliphatic urethane triacrylate, trimethylolpropane triacrylate and dipentaerythritol pentaacrylate.

As nitrogenous crosslinking promoter, mention may be made of triallyl cyanurate, triallyl isocyanurate and N,N'-m-phenylenedimaleimide.

Mention may also be made, as monomer multi-substituted with vinyl groups, of butadiene, chloroprene and isoprene.

In the context of the present invention, trivinylcyclohexane and divinylbenzene will preferentially be chosen as crosslinking promoter.

Among the antioxidants, mention may be made of those of the hydroquinone family, such as hydroquinone, hydroquinone bis($\beta$-hydroxyethyl)ether, hydroquinone monomethyl ether, mono-tert-butylhydroquinone, di-tert-butylhydroquinone and di-tert-amylhydroquinone; mention may be made particularly of antioxidants of the phenol family, such as 2,2'-thiodiethylenebis[3-(3,5-di-t-butyl-4-hydroxyphenyl)propionate], 4,6-bis(octylthiomethyl)-o-cresol and 4,4'-thiobis(2-t-butyl-5-methylphenol).

The present invention relates to a primer mixture comprising only two components, namely the free-radical initiator and the crosslinking promoter. Once this primer mixture has been made, it is intended to impregnate polyethylene.

Various components may then be added to this composition (primer mixture according to the invention with polyethylene), which may comprise UV stabilizers; processing agents, having the function of improving the final appearance during its use, such as fatty amides, stearic acid and salts thereof, ethylenebisstearamide or fluoro polymers; antifogging agents, antiblocking agents such as silica or talc;

fillers such as calcium carbonate and nanofillers, for instance clays; couplers such as silanes; antistatic agents; nucleating agents, pigments; dyes; plasticizers; fluidizers and flame-retarding additives such as aluminum or magnesium hydroxides.

According to the invention, one or more crosslinking retardants may also be introduced, after preparing/manufacturing the primer mixture according to the invention, such as antioxidant compounds of the hydroquinone family and phenolic antioxidants.

These additives are generally used in contents of between 10 ppm and 10 000 ppm by weight relative to the weight of final polymer. The plasticizers, fluidizers and flame-retardant additives may be in amounts much greater than 10 000 ppm.

Example of preparation of a primer mixture according to the invention:

First, ten (10) grams (g) of dicumyl peroxide are added to 10 g of trivinyl-cyclohexane, and the mixture is then stirred at a temperature of 50° C. (Celsius) for a period of five (5) minutes; the mixture obtained is homogeneous. At this stage, the primer mixture according to the invention is obtained.

Next, 300 g of low-density polyethylene (LDPE) are placed in a glass container, such as one (1) liter (L) Schott bottle. Next, 6 g of the primer mixture preheated to 60° C. are added to the LDPE, and the closed container is placed on a roll mixer at a speed of 15 rpm (revolutions per minute). Once the impregnation time has elapsed, the LDPE-based component is recovered and may be crosslinked at the appropriate temperature (typically between 170° C. and 200° C.).

Tests Performed:
Measurement of the Impregnation Time

Example 1: Free-Radical Initiator Used Alone 300 g of low-density polyethylene (LDPE) preheated to 60° C. are placed in a glass container, a 1 L (one liter) Schott bottle. Next, 6 g of dicumyl peroxide preheated to 60° C. are added to the LDPE, and the container is closed and placed on a roll mixer at a speed of 15 rpm at 60° C. At regular time intervals, 13 g of the LDPE-based component are taken from the bottle and placed in 20 ml of methanol to be mixed for 30 seconds (s) using a wooden spatula, and the mixture is then filtered on a screen. The peroxide not adsorbed is thus removed from the surface of the LDPE by the methanol, the adsorbed peroxide remaining in the LDPE granules, which are then heated on an screen under a fume cupboard and then analyzed using an RPA2000 rheometer.

The change in crosslinking density is detailed in table 1 below.

TABLE 1

Change in crosslinking densities and kinetics as a function of the impregnation time for dicumyl peroxide used alone.
DCP 2 phr

| | | RPA @ 190° C. | | | Mean values | | |
|---|---|---|---|---|---|---|---|
| Withdrawal | Test No. | $M_H$-$M_L$ (dNm) | $t_{90}$ (m:s) | ts2 (m:s) | $M_H$-$M_L$ (dNm) | $t_{90}$ (m:s) | ts2 (m:s) |
| 00:15:00 | Test 1 | 1.72 | 02:18 | | 1.69 | 02:21 | |
| | Test 2 | 1.65 | 02:24 | | | | |
| 00:30:00 | Test 1 | 2.63 | 02:27 | 01:41 | 2.65 | 02:22 | 01:38 |
| | Test 2 | 2.66 | 02:16 | 01:35 | | | |
| 00:45:00 | Test 1 | 3.43 | 02:17 | 01:09 | 3.57 | 02:17 | 01:07 |
| | Test 2 | 3.70 | 02:18 | 01:05 | | | |

TABLE 1-continued

Change in crosslinking densities and kinetics as a function of the impregnation time for dicumyl peroxide used alone.
DCP 2 phr

| | | RPA @ 190° C. | | | Mean values | | |
|---|---|---|---|---|---|---|---|
| Withdrawal | Test No. | $M_H$-$M_L$ (dNm) | $t_{90}$ (m:s) | ts2 (m:s) | $M_H$-$M_L$ (dNm) | $t_{90}$ (m:s) | ts2 (m:s) |
| 02:10:00 | Test 1 | 10.63 | 02:04 | 00:34 | 11.16 | 02:04 | 00:34 |
| | Test 2 | 11.68 | 02:04 | 00:33 | | | |
| 03:10:00 | Test 1 | 14.20 | 01:59 | 00:31 | 14.59 | 02:00 | 00:31 |
| | Test 2 | 14.97 | 02:01 | 00:30 | | | |
| 04:00:00 | Test 1 | 18.45 | 02:00 | 00:29 | 18.38 | 02:00 | 00:30 |
| | Test 2 | 18.31 | 01:59 | 00:31 | | | |
| 05:00:00 | Test 1 | 20.39 | 02:00 | 00:28 | 20.05 | 01:59 | 00:28 |
| | Test 2 | 19.71 | 01:58 | 00:28 | | | |

Example 2: Free-Radical Initiator Predissolved in the Crosslinking Promoter 1,2,4-Trivinylcyclohexane (50/50 Composition)

300 g of low-density polyethylene (LDPE) preheated to 60° C. are placed in a glass container, namely, for example, a 1 L Schott bottle. Next, 7.2 g of a mixture containing 50% dicumyl peroxide and 50% trivinylcyclohexane preheated to 60° C. are added to the LDPE, and the container is closed and placed on a roll mixer at a speed of 15 rpm at 60° C. At regular time intervals, 13 g of LDPE-based component are withdrawn from the bottle and placed in 20 milliliters (ml) of methanol and mixed for 30 seconds with a wooden spatula, and the mixture is then filtered on a screen. The peroxide not adsorbed is thus removed from the surface of the LDPE by the methanol, the adsorbed peroxide remaining in the LDPE granules, which are then dried on a screen under a fume cupboard and then analyzed using an RPA2000 rheometer.

The change in crosslinking density is detailed in table 2 below.

TABLE 2

Change in crosslinking densities and kinetics as a function of the impregnation time for dicumyl peroxide premixed with trivinylcyclohexane in mass proportions of 50% peroxide/50% trivinylcyclohexane.
DCP/TVCH 50/50 2.43 phr

| | | RPA @ 190° C. | | | Mean values | | |
|---|---|---|---|---|---|---|---|
| Withdrawal | Test No. | $M_H$-$M_L$ (dNm) | $t_{90}$ (m:s) | ts2 (m:s) | $M_H$-$M_L$ (dNm) | $t_{90}$ (m:s) | ts2 (m:s) |
| 00:15:00 | Test 1 | 1.10 | 02:25 | | 1.09 | 02:31 | |
| | Test 2 | 1.08 | 02:38 | | | | |
| 00:30:00 | Test 1 | 4.01 | 02:27 | 01:09 | 4.21 | 02:29 | 01:07 |
| | Test 2 | 4.41 | 02:31 | 01:05 | | | |
| 02:10:00 | Test 1 | 16.60 | 02:19 | 00:36 | 16.84 | 02:20 | 00:36 |
| | Test 2 | 17.08 | 02:21 | 00:36 | | | |
| 04:00:00 | Test 1 | 17.89 | 02:26 | 00:37 | 18.15 | 02:24 | 00:37 |
| | Test 2 | 18.41 | 02:22 | 00:37 | | | |
| 05:00:00 | Test 1 | 21.62 | 02:26 | 00:37 | 21.44 | 02:28 | 00:39 |
| | Test 2 | 21.25 | 02:29 | 00:41 | | | |

Example 3: Free-Radical Initiator Predissolved in the Crosslinking Promoter 1,2,4-Trivinylcyclohexane (75/25 Composition)

300 g of low-density polyethylene (LDPE) preheated to 60° C. are placed in a glass container, a 1 L Schott bottle. Next, 5 g of a mixture containing 75% dicumyl peroxide and 25% trivinylcyclohexane preheated to 60° C. are added to the LDPE, and the container is closed and placed on a roll mixer at a speed of 15 rpm at 60° C. At regular time intervals, 13 g of LDPE-based component are withdrawn from the bottle and placed in 20 ml of methanol and mixed for 30 seconds with a wooden spatula, and the mixture is then filtered on a screen. The peroxide not adsorbed is thus removed from the surface of the LDPE by the methanol, the adsorbed peroxide remaining in the LDPE granules, which are then dried on a screen under a fume cupboard and then analyzed using an RPA2000 rheometer.

The change in crosslinking density is detailed in table 3 below.

TABLE 3

Change in crosslinking densities and kinetics as a function of the impregnation time for dicumyl peroxide premixed with trivinylcyclohexane in mass proportions of 75% peroxide/25% trivinylcyclohexane. DCP/TVCH 75/25 1.66 phr

| | | RPA @ 190° C. | | | Mean values | | |
|---|---|---|---|---|---|---|---|
| Withdrawal | Test No. | $M_H$-$M_L$ (dNm) | $t_{90}$ (m:s) | ts2 (m:s) | $M_H$-$M_L$ (dNm) | $t_{90}$ (m:s) | ts2 (m:s) |
| 00:15:00 | Test 1 | 1.83 | 02:26 | | 1.80 | 02:25 | |
| | Test 2 | 1.77 | 02:25 | | | | |
| 00:30:00 | Test 1 | 3.92 | 02:29 | 01:09 | 3.95 | 02:28 | 01:08 |
| | Test 2 | 3.97 | 02:26 | 01:08 | | | |
| 01:00:00 | Test 1 | 10.44 | 02:15 | 00:38 | 10.36 | 02:15 | 00:39 |
| | Test 2 | 10.28 | 02:14 | 00:39 | | | |
| 01:30:00 | Test 1 | 14.48 | 02:07 | 00:33 | 14.40 | 02:08 | 00:34 |
| | Test 2 | 14.31 | 02:09 | 00:34 | | | |
| 02:00:00 | Test 1 | 17.11 | 02:04 | 00:32 | 17.04 | 02:05 | 00:33 |
| | Test 2 | 16.97 | 02:06 | 00:33 | | | |
| 02:30:00 | Test 1 | 16.30 | 02:03 | 00:33 | 16.91 | 02:00 | 00:32 |
| | Test 2 | 17.52 | 01:57 | 00:30 | | | |
| 05:00:00 | Test 1 | 21.22 | 02:04 | 00:33 | 21.10 | 02:06 | 00:35 |
| | Test 2 | 20.98 | 02:08 | 00:36 | | | |

Example 4: Free-Radical Initiator Predissolved in the Crosslinking Promoter Divinylbenzene (50/50 Composition)

300 g of low-density polyethylene (LDPE) preheated to 60° C. are placed in a glass container, a 1 L Schott bottle. Next, 7.2 g of a mixture containing 50% dicumyl peroxide and 50% trivinylcyclohexane preheated to 60° C. are added to the LDPE, and the container is closed and placed on a roll mixer at a speed of 15 rpm at 60° C. At regular time intervals, 13 g of LDPE-based component are withdrawn from the bottle and placed in 20 ml of methanol and mixed for 30 seconds with a wooden spatula, and the mixture is then filtered on a screen. The peroxide not adsorbed is thus removed from the surface of the LDPE by the methanol, the adsorbed peroxide remaining in the LDPE granules, which are then dried on a screen under a fume cupboard and then analyzed using an RPA2000 rheometer.

The change in crosslinking density is detailed in table 4 below.

TABLE 4

Change in crosslinking densities and kinetics as a function of the impregnation time for dicumyl peroxide premixed with divinylbenzene in mass proportions of 50% peroxide/50% divinylbenzene. DCP/DVB 50/50 2.43 phr

| | | RPA @ 190° C. | | | Mean values | | |
|---|---|---|---|---|---|---|---|
| Withdrawal | Test No. | $M_H$-$M_L$ (dNm) | $t_{90}$ (m:s) | ts2 (m:s) | $M_H$-$M_L$ (dNm) | $t_{90}$ (m:s) | ts2 (m:s) |
| 00:15:00 | Test 1 | 0.801 | 02:26 | | 0.80 | 02:26 | |
| | Test 2 | | | | | | |
| 00:30:00 | Test 1 | 2.868 | 02:27 | 01:28 | 2.82 | 02:24 | 01:29 |
| | Test 2 | 2.779 | 02:22 | 01:31 | | | |
| 00:45:00 | Test 1 | 4.369 | 02:18 | 00:55 | 4.40 | 02:18 | 00:54 |
| | Test 2 | 4.428 | 02:18 | 00:54 | | | |
| 02:10:00 | Test 1 | 14.56 | 02:04 | 00:29 | 14.61 | 02:05 | 00:29 |
| | Test 2 | 14.65 | 02:07 | 00:29 | | | |
| 03:10:00 | Test 1 | 17.85 | 02:01 | 00:27 | 17.92 | 02:01 | 00:27 |
| | Test 2 | 17.79 | 02:01 | 00:27 | | | |
| 04:00:00 | Test 1 | 18.12 | 02:02 | 00:28 | 18.52 | 02:01 | 00:27 |
| | Test 2 | 18.58 | 02:00 | 00:27 | | | |
| 05:00:00 | Test 1 | 18.46 | 01:59 | 00:27 | 18.48 | 01:59 | 00:27 |
| | Test 2 | 18.48 | 02:00 | 00:27 | | | |

FIG. 1 shows the comparison of the crosslinking density values obtained using an RPA2000 rheometer between the 4 systems, i.e. examples 1, 2, 3 and 4 described above.

It is clearly seen that premixing the peroxide with trivinylcyclohexane brings about a very significant reduction in the adsorption time. After two hours of mixing, for example, the two samples of polyethylene supplemented with the mixtures of trivinylcyclohexane plus dicumyl peroxide show a crosslinking density of greater than 16 dN·m, whereas it takes about four hours to reach this same crosslinking density with dicumyl peroxide added alone to the polyethylene (example 1).

The use of divinylbenzene also improves the adsorption of the dicumyl peroxide: the mixture containing this additive requires 3 hours to reach a crosslinking density of 16 dN·m.

Measurement of the Desorption Time

Example 5: Free-Radical Initiator Used Alone 300 g of low-density polyethylene (LDPE) are placed in a glass container, more precisely, for example, a 1 L Schott bottle. Next, 6 g of dicumyl peroxide preheated to 60° C. are added to the LDPE, and the container is closed and placed on a roll mixer at a speed of 15 rpm at 60° C. Once the impregnation time has elapsed, the bottle is placed in a hermetic container at a temperature of 5° C. At regular time intervals, 13 g of LDPE-based component are withdrawn from the bottle and placed in 20 ml of methanol to be mixed for 30 seconds with a wooden spatula, and the mixture is then filtered on a screen. The LDPE granules are thus freed of the peroxide that may have been desorbed. The granules are then dried on a screen under a fume cupboard and then analyzed using an RPA2000 rheometer.

The change in crosslinking density is detailed in table 5 below, which shows that desorption takes place from the first day in the case of dicumyl peroxide used alone.

DCP 2 phr

| | | RPA @ 190° C. | | | Mean values | | |
|---|---|---|---|---|---|---|---|
| Withdrawal | Test No. | $M_H$-$M_L$ (dNm) | $t_{90}$ (m:s) | ts2 (m:s) | $M_H$-$M_L$ (dNm) | $t_{90}$ (m:s) | ts2 (m:s) |
| 0 day | Test 1 | 20.39 | 02:00 | 00:28 | 20.05 | 01:59 | 00:28 |
| | Test 2 | 19.71 | 01:58 | 00:28 | | | |
| 1 day | Test 1 | 14.85 | 01:58 | 00:31 | 14.60 | 01:59 | 00:31 |
| | Test 2 | 14.35 | 02:00 | 00:31 | | | |
| 2 days | Test 1 | 14.32 | 01:59 | 00:32 | 14.49 | 01:59 | 00:32 |
| | Test 2 | 14.66 | 01:59 | 00:31 | | | |
| 3 days | Test 1 | 14.73 | 02:00 | 00:31 | 14.62 | 02:00 | 00:31 |
| | Test 2 | 14.51 | 02:00 | 00:31 | | | |
| 4 days | Test 1 | 14.19 | 02:03 | 00:32 | 14.29 | 02:01 | 00:32 |
| | Test 2 | 14.39 | 02:00 | 00:32 | | | |
| 5 days | Test 1 | 14.27 | 02:03 | 00:31 | 14.44 | 02:01 | 00:31 |
| | Test 2 | 14.60 | 01:59 | 00:30 | | | |

Example 6: Free-Radical Initiator Predissolved in a Crosslinking Promoter (50/50 Composition)

300 g of low-density polyethylene (LDPE) are placed in a glass container, a 1 L Schott bottle. Next, 7.2 g of a mixture containing 50% dicumyl peroxide and 50% trivinylcyclohexane preheated to 60° C. is added to the LDPE, and the container is closed and placed on a roll mixer at a speed of 15 rpm at 60° C. Once the impregnation time has elapsed, the bottle is placed in a hermetic container at 5° C. At regular time intervals, 13 g of LDPE-based component are withdrawn from the bottle and placed in 20 ml of methanol to be mixed for 30 seconds with a wooden spatula, and the mixture is then filtered on a screen. The LDPE granules are thus freed of the peroxide that may have been desorbed, and are then dried on a screen under a fume cupboard and then analyzed using an RPA2000 rheometer. The change in crosslinking density is detailed in table 6 below, which shows that no desorption is detected in the first five (5) days in the case of dicumyl peroxide used premixed with trivinylcyclohexane in mass proportions of 50% peroxide/50% trivinylcyclohexane.

TABLE 6

Change in crosslinking densities and kinetics as a function of the storage time at 5° C. for dicumyl peroxide premixed with trivinylcyclohexane in mass proportions of 50% peroxide/50% trivinylcyclohexane.
50/50 2.43 phr

| | | RPA @ 190° C. | | | Mean values | | |
|---|---|---|---|---|---|---|---|
| Withdrawal | Test No. | $M_H$-$M_L$ (dNm) | $t_{90}$ (m:s) | ts2 (m:s) | $M_H$-$M_L$ (dNm) | $t_{90}$ (m:s) | ts2 (m:s) |
| 0 day | Test 1 | 20.41 | 02:20 | 00:35 | 20.80 | 02:20 | 00:35 |
| | Test 2 | 20.80 | 02:19 | 00:35 | | | |
| 1 day | Test 1 | 21.08 | 02:36 | 00:35 | 20.69 | 02:30 | 00:36 |
| | Test 2 | 20.30 | 02:24 | 00:36 | | | |
| 2 days | Test 1 | 20.78 | 02:26 | 00:36 | 20.55 | 02:24 | 00:36 |
| | Test 2 | 20.31 | 02:22 | 00:36 | | | |
| 3 days | Test 1 | 20.28 | 02:27 | 00:35 | 20.32 | 02:25 | 00:36 |
| | Test 2 | 20.35 | 02:23 | 00:36 | | | |
| 4 days | Test 1 | 20.24 | 02:19 | 00:35 | 20.57 | 02:20 | 00:35 |
| | Test 2 | 20.89 | 02:21 | 00:35 | | | |
| 5 days | Test 1 | 20.38 | 02:23 | 00:36 | 20.76 | 02:22 | 00:36 |
| | Test 2 | 21.13 | 02:22 | 00:35 | | | |

Example 7: Free-Radical Initiator Predissolved in a Crosslinking Promoter (75/25 Composition)

300 g of low-density polyethylene (LDPE) are placed in a glass container, a 1 L Schott bottle. Next, 7.2 g of a mixture containing 50% dicumyl peroxide and 50% trivinylcyclohexane preheated to 60° C. is added to the LDPE, and the container is closed and placed on a roll mixer at a speed of 15 rpm at 60° C. Once the impregnation time has elapsed, the bottle is placed in a container (adiabatic) at 5° C. At regular time intervals, 13 g of LDPE-based component are withdrawn from the bottle and placed in 20 ml of methanol to be mixed for 30 seconds with a wooden spatula, and the mixture is then filtered on a screen. The LDPE granules are thus freed of the peroxide that may have been desorbed, and are then dried on a screen under a fume cupboard and then analyzed using an RPA2000 rheometer. The change in crosslinking density is detailed in table 7 below, which shows that no desorption is detected in the first five (5) days in the case of dicumyl peroxide used premixed with trivinylcyclohexane in mass proportions of 75% peroxide/25% trivinylcyclohexane.

TABLE 7

Change in crosslinking densities and kinetics as a function of the storage time at 5° C. for dicumyl peroxide premixed with trivinylcyclohexane in mass proportions of 75% peroxide/25% trivinylcyclohexane.
75/25 1.66 phr

| | | RPA @ 190° C. | | | Mean values | | |
|---|---|---|---|---|---|---|---|
| Withdrawal | Test No. | $M_H$-$M_L$ (dNm) | $t_{90}$ (m:s) | ts2 (m:s) | $M_H$-$M_L$ (dNm) | $t_{90}$ (m:s) | ts2 (m:s) |
| 0 day | Test 1 | 19.27 | 02:03 | 00:31 | 18.88 | 02:04 | 00:32 |
| | Test 2 | 18.49 | 02:05 | 00:32 | | | |
| 1 days | Test 1 | 19.57 | 02:05 | 00:32 | 19.71 | 02:05 | 00:32 |
| | Test 2 | 19.84 | 02:05 | 00:32 | | | |
| 2 days | Test 1 | 20.02 | 02:04 | 00:32 | 20.06 | 02:03 | 00:32 |
| | Test 2 | 20.09 | 02:03 | 00:32 | | | |
| 3 days | Test 1 | 19.75 | 02:06 | 00:31 | 19.91 | 02:06 | 00:32 |
| | Test 2 | 20.06 | 02:05 | 00:32 | | | |
| 4 days | Test 1 | 19.82 | 02:01 | 00:31 | 19.71 | 02:03 | 00:32 |
| | Test 2 | 19.59 | 02:05 | 00:32 | | | |
| 5 days | Test 1 | 19.75 | 02:06 | 00:33 | 19.75 | 02:05 | 00:32 |
| | Test 2 | 19.75 | 02:03 | 00:31 | | | |

FIG. 2 shows the comparison of the crosslinking density values obtained using an RPA2000 rheometer between the 3 systems (examples 5, 6 and 7 presented above).

It is clearly seen that premixing the peroxide very significantly slows down the desorption phenomenon, since no desorption was detected after five (5) days at 5° C., whereas the reference (example 5), peroxide used alone, desorbs from the first day under the chosen experimental conditions.

The present invention makes it possible to significantly reduce the volatile products, and more particularly methane, which are predominantly derived from the decomposition of the organic peroxide. Specifically, it has been shown that the present invention makes it possible to obtain acceptable levels of crosslinking by using up to 40% less organic peroxide, and in consequence the amount of volatile products is also reduced, this reduction being up to 40%.

The invention claimed is:
1. A primer mixture configured for crosslinking polyethylene, comprising at least one free-radical initiator chosen from organic peroxides, azo compounds or mixtures thereof, and at least one crosslinking promoter chosen from cycloalkanes containing 5 to 7 carbon atoms, substituted with 1 to 3 vinyl or allyl groups,
wherein the weight ratio of free-radical initiator to crosslinking promoter is greater than or equal to 1, and wherein the primer mixture is subjected to a dissolution and homogenization operation, which results in dissolution of the free-radical initiator in the crosslinking promoter.

2. The mixture of claim 1, wherein the crosslinking promoter is trivinylcycloalkane.

3. The mixture of claim 1, wherein the free-radical initiator is dicumyl peroxide, 2,5-dimethyl-2,5-bis(t-butylperoxy)hexane or bis[(t-butylperoxy)isopropyl]benzene or a mixture of these initiators.

4. The mixture of claim 1, wherein the primer mixture is in liquid form at room temperature.

5. A process for manufacturing crosslinked polyethylene, comprising a final step of crosslinking polyethylene, wherein:
   a free-radical initiator is chosen from organic peroxides, azo compounds or mixtures thereof, wherein
   at least one crosslinking promoter is chosen from cycloalkanes containing 5 to 7 carbon atoms, substituted with 1 to 3 vinyl or allyl groups, and
wherein a step of dilution of said free-radical initiator with said crosslinking promoter is initially performed, and impregnation of polyethylene with the primer mixture thus formed of claim 1, in liquid form.

6. The process of claim 5, wherein the crosslinking promoter is present in liquid form at room temperature and ambient pressure.

7. The process of claim 5, wherein the step of crosslinking polyethylene is performed by extrusion or by injection-molding.

8. A method of producing cables comprising forming a cable from the primer mixture of claim 1, wherein the cable is configured for transporting fluid or electrical current.

9. The mixture of claim 1, wherein the weight ratio of free-radical initiator to crosslinking promoter is between 1.5 and 4.

10. The mixture of claim 1, wherein the primer mixture is in liquid form at least for a temperature of between 10° C. and 50° C. at ambient pressure (1 bar).

11. The process of claim 5, wherein said initiator is chosen from dicumyl peroxide, 2,5-dimethyl-2,5-bis(t-butylperoxy)hexane and bis[(t-butylperoxy)isopropyl]benzene or a mixture of these initiators.

12. The process of claim 5, wherein-the crosslinking promoter is present in liquid form at a temperature of between 10° C. and 50° C. at a pressure of 1 bar.

13. A process for manufacturing crosslinked polyethylene, comprising:
   dissolution and homogenization of a free-radical initiator in at least one crosslinking promoter to form a primer mixture in liquid form, wherein said free-radical initiator is chosen from organic peroxides, azo compounds or mixtures thereof, and wherein said at least one crosslinking promoter is chosen from cycloalkanes containing 5 to 7 carbon atoms, substituted with 1 to 3 vinyl or allyl groups, aromatic compounds substituted with 1 to 3 vinyl or allyl groups, multi-substituted monomers based on methacrylate, acrylate, maleimide, and in that the weight ratio of free-radical initiator to crosslinking promoter is greater than or equal to 1;
   wherein the primer mixture is impregnated into granules of polyethylene; and
   crosslinking the polyethylene.

14. The process of claim 13, wherein the crosslinking promoter is present in liquid form at room temperature and ambient pressure.

15. The process of claim 13, wherein the crosslinking polyethylene is performed by extrusion or by injection-molding.

16. The process of claim 13, wherein said free-radical initiator is chosen from dicumyl peroxide, 2,5-dimethyl-2,5-bis(t-butylperoxy)hexane and bis[(t-butylperoxy)isopropyl]benzene or a mixture thereof, and
   wherein said crosslinking promoter is chosen from trivinylcycloalkane and/or divinylbenzene.

17. The process of claim 13, wherein-the crosslinking promoter is present in liquid form at a temperature of between 10° C. and 50° C. at a pressure of 1 bar.

* * * * *